United States Patent
Maass et al.

(10) Patent No.: US 11,216,762 B1
(45) Date of Patent: Jan. 4, 2022

(54) AUTOMATED RISK VISUALIZATION USING CUSTOMER-CENTRIC DATA ANALYSIS

(71) Applicant: Palantir Technologies Inc., Palo Alto, CA (US)

(72) Inventors: Alexander Maass, New York, NY (US); Ben Regev, Holon (IL); Duncan Hoffman, Paris (FR); Eugene Mak, Hurlstone Park (AU); Elise Norman, London (GB); Elizabeth Patitucci, London (GB); Yevhen Shevchuk, Kiev (UA); Harkirat Singh, London (GB); Joshua Aschheim, New York, NY (US); Juan Jimenez Puig, Amsterdam (NL); Jorien Van Den Bergh, London (GB); Kai Kamberger, London (GB); Maciej Biskupiak, New York, NY (US); Marissa Miracolo, Lancashire (GB); Matthew Julius Wilson, London (GB); Nicolas Prettejohn, Bath (GB); Patrick Walter, Berlin (DE); Rootul Patel, Oyster Bay, NY (US); Stephen Heitkamp, London (GB); Richard Deitch, Dallas, TX (US)

(73) Assignee: Palantir Technologies Inc., Palo Alto, CA (US)

( * ) Notice: Subject to any disclaimer, the term of this patent is extended or adjusted under 35 U.S.C. 154(b) by 409 days.

(21) Appl. No.: 15/684,507

(22) Filed: Aug. 23, 2017

Related U.S. Application Data

(60) Provisional application No. 62/532,193, filed on Jul. 13, 2017.

(51) Int. Cl.
*G06Q 10/06* (2012.01)
*G06Q 20/10* (2012.01)

(52) U.S. Cl.
CPC ......... *G06Q 10/0635* (2013.01); *G06Q 20/10* (2013.01)

(58) Field of Classification Search
CPC .................... G06Q 10/0635; G06Q 20/10
See application file for complete search history.

(56) References Cited

U.S. PATENT DOCUMENTS

| | | |
|---|---|---|
| 5,819,226 A | 10/1998 | Gopinathan et al. |
| 5,892,900 A | 4/1999 | Ginter et al. |

(Continued)

FOREIGN PATENT DOCUMENTS

| | | |
|---|---|---|
| CN | 102546446 | 7/2012 |
| CN | 103167093 | 6/2013 |

(Continued)

OTHER PUBLICATIONS

Big Data based Faud Risk Management at Alibaba; Chen et el; Jul. 14, 2015 (Year: 2015).*

(Continued)

*Primary Examiner* — Deirdre D Hatcher
(74) *Attorney, Agent, or Firm* — Sheppard Mullin Richter & Hampton LLP

(57) ABSTRACT

A customer risk trigger associated with a customer may be identified. A response to the customer risk trigger may be detected. First risk analysis data related to the customer risk trigger may be gathered, based on the response, from a first datastore. Second risk analysis data related to the customer risk trigger may be gathered, based on the response, from a second datastore. A customer risk profile to model risk attribute(s) of the customer may be gathered. The risk attributes may represent a risk correlation between the customer and a prohibited act. Customer risk visualization tool(s) configured to facilitate visual user interaction with the customer risk profile may be gathered. The customer risk (Continued)

visualization tools may be rendered in a display of the computing system. The customer risk visualization tools provide a customer-centric view of risk for various applications, including anti-money laundering applications.

20 Claims, 9 Drawing Sheets

(56) References Cited

U.S. PATENT DOCUMENTS

| | | | |
|---|---|---|---|
| 6,094,643 | A | 7/2000 | Anderson et al. |
| 6,430,305 | B1 | 8/2002 | Decker |
| 6,820,135 | B1 | 11/2004 | Dingman |
| 6,978,419 | B1 | 12/2005 | Kantrowitz |
| 6,980,984 | B1 | 12/2005 | Huffman et al. |
| 6,999,943 | B1 * | 2/2006 | Johnson .............. G06Q 20/10 705/35 |
| 7,168,039 | B2 | 1/2007 | Bertram |
| 7,617,232 | B2 | 11/2009 | Gabbert et al. |
| 7,756,843 | B1 | 7/2010 | Palmer |
| 7,899,796 | B1 | 3/2011 | Borthwick et al. |
| 7,917,376 | B2 | 3/2011 | Bellin et al. |
| 7,941,321 | B2 | 5/2011 | Greenstein et al. |
| 8,036,971 | B2 | 10/2011 | Aymeloglu et al. |
| 8,046,283 | B2 | 10/2011 | Burns |
| 8,054,756 | B2 | 11/2011 | Chand et al. |
| 8,214,490 | B1 | 7/2012 | Vos et al. |
| 8,229,902 | B2 | 7/2012 | Vishniac et al. |
| 8,290,838 | B1 | 10/2012 | Thakur et al. |
| 8,302,855 | B2 | 11/2012 | Ma et al. |
| 8,473,454 | B2 | 6/2013 | Evanitsky et al. |
| 8,484,115 | B2 | 7/2013 | Aymeloglu et al. |
| 8,589,273 | B2 | 11/2013 | Creeden et al. |
| 8,600,872 | B1 | 12/2013 | Yan |
| 8,666,861 | B2 | 3/2014 | Li et al. |
| 8,688,573 | B1 | 4/2014 | Ruknoic et al. |
| 8,744,890 | B1 | 6/2014 | Bernier |
| 8,798,354 | B1 | 8/2014 | Bunzel et al. |
| 8,812,960 | B1 | 8/2014 | Sun et al. |
| 8,924,388 | B2 | 12/2014 | Elliot et al. |
| 8,924,389 | B2 | 12/2014 | Elliot et al. |
| 8,938,686 | B1 | 1/2015 | Erenrich et al. |
| 8,949,164 | B1 | 2/2015 | Mohler |
| 9,032,531 | B1 | 5/2015 | Scorvo et al. |
| 9,100,428 | B1 | 8/2015 | Visbal |
| 9,129,219 | B1 | 9/2015 | Robertson et al. |
| 2001/0027424 | A1 | 10/2001 | Torigoe |
| 2002/0065708 | A1 | 5/2002 | Senay et al. |
| 2002/0095360 | A1 | 7/2002 | Joao |
| 2002/0095658 | A1 | 7/2002 | Shulman |
| 2002/0103705 | A1 | 8/2002 | Brady |
| 2002/0147805 | A1 | 10/2002 | Leshem et al. |
| 2003/0126102 | A1 | 7/2003 | Borthwick |
| 2004/0034570 | A1 | 2/2004 | Davis |
| 2004/0111480 | A1 | 6/2004 | Yue |
| 2004/0153418 | A1 | 8/2004 | Hanweck |
| 2004/0236688 | A1 | 11/2004 | Bozeman |
| 2005/0010472 | A1 | 1/2005 | Quatse et al. |
| 2005/0086207 | A1 | 4/2005 | Heuer et al. |
| 2005/0133588 | A1 | 6/2005 | Williams |
| 2005/0149455 | A1 | 7/2005 | Bruesewitz et al. |
| 2005/0154628 | A1 | 7/2005 | Eckart et al. |
| 2005/0154769 | A1 | 7/2005 | Eckart et al. |
| 2006/0026120 | A1 | 2/2006 | Carolan et al. |
| 2006/0143034 | A1 | 6/2006 | Rothermel |
| 2006/0143075 | A1 | 6/2006 | Carr et al. |
| 2006/0143079 | A1 | 6/2006 | Basak et al. |
| 2007/0000999 | A1 | 1/2007 | Kubo et al. |
| 2007/0011304 | A1 | 1/2007 | Error |
| 2007/0038646 | A1 | 2/2007 | Thota |
| 2007/0061259 | A1 | 3/2007 | Zoldi et al. |
| 2007/0106582 | A1 | 5/2007 | Baker et al. |
| 2007/0150801 | A1 | 6/2007 | Chidlovskii et al. |
| 2007/0156673 | A1 | 7/2007 | Maga |
| 2007/0185867 | A1 | 8/2007 | Maga |
| 2007/0239606 | A1 | 10/2007 | Eisen |
| 2007/0284433 | A1 | 12/2007 | Domenica et al. |
| 2008/0046481 | A1 | 2/2008 | Gould et al. |
| 2008/0069081 | A1 | 3/2008 | Chand et al. |
| 2008/0103798 | A1 | 5/2008 | Domenikos et al. |
| 2008/0103996 | A1 | 5/2008 | Forman et al. |
| 2008/0140576 | A1 | 6/2008 | Lewis et al. |
| 2008/0222038 | A1 | 9/2008 | Eden et al. |
| 2008/0222295 | A1 | 9/2008 | Robinson et al. |
| 2008/0243711 | A1 | 10/2008 | Aymeloglu et al. |
| 2008/0255973 | A1 | 10/2008 | El Wade et al. |
| 2008/0301042 | A1 | 12/2008 | Patzer |
| 2008/0313132 | A1 | 12/2008 | Hao et al. |
| 2009/0018996 | A1 | 1/2009 | Hunt et al. |
| 2009/0076845 | A1 | 3/2009 | Bellin et al. |
| 2009/0094166 | A1 | 4/2009 | Aymeloglu et al. |
| 2009/0106178 | A1 | 4/2009 | Chu |
| 2009/0112745 | A1 | 4/2009 | Stefanescu |
| 2009/0125359 | A1 | 5/2009 | Knapic |
| 2009/0125459 | A1 | 5/2009 | Norton et al. |
| 2009/0187546 | A1 | 7/2009 | Whyte et al. |
| 2009/0187548 | A1 | 7/2009 | Ji et al. |
| 2009/0228365 | A1 | 9/2009 | Tomchek et al. |
| 2009/0249244 | A1 | 10/2009 | Robinson et al. |
| 2009/0271343 | A1 | 10/2009 | Vaiciulis et al. |
| 2009/0281839 | A1 | 11/2009 | Lynn et al. |
| 2009/0307049 | A1 | 12/2009 | Elliott et al. |
| 2009/0313463 | A1 | 12/2009 | Pang et al. |
| 2009/0319418 | A1 | 12/2009 | Herz |
| 2009/0319891 | A1 | 12/2009 | MacKinlay |
| 2010/0030722 | A1 | 2/2010 | Goodson et al. |
| 2010/0031141 | A1 | 2/2010 | Summers et al. |
| 2010/0042922 | A1 | 2/2010 | Bradateanu et al. |
| 2010/0057622 | A1 | 3/2010 | Faith et al. |
| 2010/0070842 | A1 | 3/2010 | Aymeloglu et al. |
| 2010/0094765 | A1 | 4/2010 | Nandy |
| 2010/0098318 | A1 | 4/2010 | Anderson |
| 2010/0114887 | A1 | 5/2010 | Conway et al. |
| 2010/0131502 | A1 | 5/2010 | Fordham |
| 2010/0161735 | A1 | 6/2010 | Sharma |
| 2010/0169192 | A1 | 7/2010 | Zoldi et al. |
| 2010/0191563 | A1 | 7/2010 | Schlaifer et al. |
| 2010/0235915 | A1 | 9/2010 | Memon et al. |
| 2010/0262688 | A1 | 10/2010 | Hussain et al. |
| 2010/0312837 | A1 | 12/2010 | Bodapati et al. |
| 2011/0004626 | A1 | 1/2011 | Naeymi-Rad et al. |
| 2011/0055074 | A1 | 3/2011 | Chen et al. |
| 2011/0061013 | A1 | 3/2011 | Bilicki et al. |
| 2011/0078173 | A1 | 3/2011 | Seligmann et al. |
| 2011/0093327 | A1 | 4/2011 | Fordyce, III et al. |
| 2011/0099133 | A1 | 4/2011 | Chang et al. |
| 2011/0099628 | A1 | 4/2011 | Lanxner et al. |
| 2011/0131122 | A1 | 6/2011 | Griffin et al. |
| 2011/0153384 | A1 | 6/2011 | Horne et al. |
| 2011/0173093 | A1 | 7/2011 | Psota et al. |
| 2011/0208565 | A1 | 8/2011 | Ross et al. |
| 2011/0213655 | A1 | 9/2011 | Henkin |
| 2011/0218955 | A1 | 9/2011 | Tang |
| 2011/0225586 | A1 | 9/2011 | Bentley et al. |
| 2011/0231305 | A1 | 9/2011 | Winters |
| 2011/0270604 | A1 | 11/2011 | Qi et al. |
| 2011/0270834 | A1 | 11/2011 | Sokolan et al. |
| 2011/0289397 | A1 | 11/2011 | Eastmond et al. |
| 2011/0295649 | A1 | 12/2011 | Fine |
| 2011/0307382 | A1 | 12/2011 | Siegel et al. |
| 2011/0314007 | A1 | 12/2011 | Dassa et al. |
| 2011/0314024 | A1 | 12/2011 | Chang et al. |
| 2012/0011238 | A1 | 1/2012 | Rathod |
| 2012/0011245 | A1 | 1/2012 | Gillette et al. |
| 2012/0022945 | A1 | 1/2012 | Falkenborg et al. |
| 2012/0054284 | A1 | 3/2012 | Rakshit |
| 2012/0059853 | A1 | 3/2012 | Jagota |
| 2012/0066064 | A1 * | 3/2012 | Yoder ................. G06Q 30/00 705/14.53 |
| 2012/0066166 | A1 | 3/2012 | Curbera et al. |
| 2012/0079363 | A1 | 3/2012 | Folting et al. |
| 2012/0084117 | A1 | 4/2012 | Tavares et al. |
| 2012/0084287 | A1 | 4/2012 | Lakshminarayan et al. |

(56) References Cited

U.S. PATENT DOCUMENTS

| | | |
|---|---|---|
| 2012/0131512 A1 | 5/2012 | Takeuchi et al. |
| 2012/0158585 A1 | 6/2012 | Ganti |
| 2012/0159362 A1 | 6/2012 | Brown et al. |
| 2012/0173381 A1 | 7/2012 | Smith |
| 2012/0215784 A1 | 8/2012 | King et al. |
| 2012/0221553 A1 | 8/2012 | Wittmer et al. |
| 2012/0226523 A1 | 9/2012 | Weiss |
| 2012/0245976 A1 | 9/2012 | Kumar et al. |
| 2012/0278249 A1 | 11/2012 | Duggal et al. |
| 2012/0323888 A1 | 12/2012 | Osann, Jr. |
| 2013/0016106 A1 | 1/2013 | Yip et al. |
| 2013/0054306 A1 | 2/2013 | Bhalla |
| 2013/0057551 A1 | 3/2013 | Ebert et al. |
| 2013/0096988 A1 | 4/2013 | Grossman et al. |
| 2013/0110746 A1 | 5/2013 | Ahn |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson |
| 2013/0185307 A1 | 7/2013 | El-Yaniv et al. |
| 2013/0226318 A1 | 8/2013 | Procyk |
| 2013/0238616 A1 | 9/2013 | Rose et al. |
| 2013/0238664 A1 | 9/2013 | Hsu et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0262328 A1 | 10/2013 | Federgreen |
| 2013/0263019 A1 | 10/2013 | Castellanos et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0325826 A1 | 12/2013 | Agarwal et al. |
| 2014/0012724 A1 | 1/2014 | O'Leary et al. |
| 2014/0012796 A1 | 1/2014 | Petersen et al. |
| 2014/0040371 A1 | 2/2014 | Gurevich et al. |
| 2014/0058914 A1 | 2/2014 | Song et al. |
| 2014/0068487 A1 | 3/2014 | Steiger et al. |
| 2014/0095363 A1 | 4/2014 | Caldwell |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0222521 A1 | 8/2014 | Chait |
| 2014/0222752 A1 | 8/2014 | Isman et al. |
| 2014/0222793 A1 | 8/2014 | Sadkin et al. |
| 2014/0229554 A1 | 8/2014 | Grunin et al. |
| 2014/0330620 A1* | 11/2014 | Abella ............ G06Q 10/06375 705/7.37 |
| 2014/0344230 A1 | 11/2014 | Krause et al. |
| 2014/0358789 A1 | 12/2014 | Boding et al. |
| 2014/0358829 A1 | 12/2014 | Hurwitz |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0106260 A1* | 4/2015 | Andrews ............ G06Q 20/4016 705/39 |
| 2015/0106379 A1 | 4/2015 | Elliot et al. |
| 2015/0134512 A1 | 5/2015 | Mueller |
| 2015/0135256 A1 | 5/2015 | Hoy et al. |
| 2015/0161611 A1 | 6/2015 | Duke et al. |
| 2015/0188872 A1 | 7/2015 | White |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2017/0178139 A1* | 6/2017 | Gieseke ............ G06Q 20/4016 |
| 2017/0300903 A1* | 10/2017 | Mori ............... G06Q 40/08 |
| 2017/0364534 A1* | 12/2017 | Zhang ............... G06N 5/04 |

FOREIGN PATENT DOCUMENTS

| | | |
|---|---|---|
| CN | 102054015 | 5/2014 |
| DE | 102014204827 | 9/2014 |
| DE | 102014204830 | 9/2014 |
| DE | 102014204834 | 9/2014 |
| EP | 2487610 | 8/2012 |
| EP | 2858018 | 4/2015 |
| EP | 2869211 | 5/2015 |
| EP | 2889814 | 7/2015 |
| EP | 2892197 | 7/2015 |
| EP | 2963595 | 1/2016 |
| WO | WO 2005/116851 | 12/2005 |

OTHER PUBLICATIONS

"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Capptain—Pilot Your Apps, <http://www.capptain.com> Printed Jul. 18, 2013 in 6 pages.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chaudhuri et al., "An Overview of Business Intelligence Technology," Communications of the ACM, Aug. 2011, vol. 54, No. 8.

Cohn, et al., "Semi-supervised clustering with user feedback," Constrained Clustering: Advances in Algorithms, Theory, and Applications 4.1 (2003): 17-32.

Countly Mobile Analytics, <http://count.ly/> Printed Jul. 18, 2013 in 9 pages.

Distimo—App Analytics, <http://www.distimo.com/app-analytics> Printed Jul. 18, 2013 in 5 pages.

Flurry Analytics, <http://www.flurry.com/> Printed Jul. 18, 2013 in 14 pages.

Google Analytics Official Website—Web Analytics & Reporting, <http://www.google.com/analytics.index.html> Printed Jul. 18, 2013 in 22 pages.

Gorr et al., "Crime Hot Spot Forecasting: Modeling and Comparative Evaluation", Grant 98-IJ-CX-K005, May 6, 2002, 37 pages.

Gu et al., "Record Linkage: Current Practice and Future Directions," Jan. 15, 2004, pp. 32.

Hansen et al., "Analyzing Social Media Networks with NodeXL: Insights from a Connected World", Chapter 4, pp. 53-67 and Chapter 10, pp. 143-164, published Sep. 2010.

Hua et al., "A Multi-attribute Data Structure with Parallel Bloom Filters for Network Services", HiPC 2006, LNCS 4297, pp. 277-288, 2006.

Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.

(56) References Cited

OTHER PUBLICATIONS

Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kontagent Mobile Analytics, <http://www.kontagent.com/> Printed Jul. 18, 2013 in 9 pages.
Localytics—Mobile App Marketing & Analytics, <http://www.localytics.com/> Printed Jul. 18, 2013 in 12 pages.
Manno et al., "Introducing Collaboration in Single-user Applications through the Centralized Control Architecture," 2010, pp. 10.
Mixpanel—Mobile Analytics, <https://mixpanel.com/> Printed Jul. 18, 2013 in 13 pages.
Open Web Analytics (OWA), <http://www.openwebanalytics.com/> Printed Jul. 19, 2013 in 5 pages.
Piwik—Free Web Analytics Software. <http://piwik.org/> Printed Jul. 19, 2013 in18 pages.
Sigrist, et al., "PROSITE, a Protein Domain Database for Functional Characterization and Annotation," Nucleic Acids Research, 2010, vol. 38, pp. D161-D166.
StatCounter—Free Invisible Web Tracker, Hit Counter and Web Stats, <http://statcounter.com/> Printed Jul. 19, 2013 in 17 pages.
TestFlight—Beta Testing on the Fly, <http://testflightapp.com/> Printed Jul. 18, 2013 in 3 pages.
trak.io, <http://trak.io/> printed Jul. 18, 2013 in 3 pages.
UserMetrix, <http://usermetrix.com/android-analytics> printed Jul. 18, 2013 in 3 pages.
Valentini et al., "Ensembles of Learning Machines", M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 4 Parts].
Wang et al., "Research on a Clustering Data De-Duplication Mechanism Based on Bloom Filter," IEEE 2010, 5 pages.
Wikipedia, "Multimap," Jan. 1, 2013, https://en.wikipedia.org/w/index.php?title=Multimap&oldid=530800748.

\* cited by examiner

| CUSTOMER INFO | TRANSACTIONS | PRODUCTS | RELATED PARTIES |
| 402 | 404 | 406 | 408 |

- [#] Open accounts
- [#] Closed accounts

- [#] Related people 1 PEP
- [#] Related companies

- [#] Confirmed screening hits
- [#] Entities outside of US
- [#] Entities missing country info
- [#] Blocked Account Total credit in the past year (accounts owned)
[$ Amount]

Total debit in the past year (accounts owned)
[$ Amount]

Risk Score
[#] (LOW-MEDIUM)   Ⓜ

Top contributing factor:
NON PERSONAL PRODUCT RISK

410

CUSTOMER INFORMATION

CUSTOMER ID
[Customer ID]

COMPANY NUMBER
[Company No.]

DATE OF INCORPORATION
[Date]

COUNTRY OF INCORPORATION
[Country]

COUNTRY OF OPERATION
[Country]

ORGANISATION TYPE
[Type]

INDUSTRY

ANNUAL SALES
[Amount]

TOTAL ASSETS
[Amount]

TOTAL EMPLOYEE NUMBER
[Number of Employees]

RELATIONSHIP OWNERS
[Name]
[Org. Number]
[Portfolio Number]

RISK

[Name]
[Org. Number]
[Portfolio Number]

CUSTOMER INFO   TRANSACTIONS   PRODUCTS   RELATED PARTIES 402   404   406   408

FILTERS  x Clear Filters

ACCOUNT NUMBER

TYPE
☑ Credit   ☑ Debit $ AMOUNT
Min: *[$####]*   To   Max: *[$####]*

DESCRIPTION SEARCH

602

TRANSACTIONS

USD
2m
1m
800k
200k

☐ Credit  ☐ Debit

[DATE] [DATE] [DATE] [DATE] [DATE] [DATE] [DATE]

Pick a date   Pick a date

604

Transaction Volume
*[####]*

Transaction Value
*[$#####.##]*

Average Amount
*[$#####.##]*

| Type ◆ | Op Date ◆ | Value Date ◆ | Op Code ◆ | Description | ▲ Origin ◆ | Recipient ◆ | Amount ◆ | Original Currency ◆ |
|---|---|---|---|---|---|---|---|---|
| ☐ ▾ | [DATE] | [DATE] | [##- OP CODE] | [TRANSFER DESCRIPTION] | | [####- ####] | [$####] | USD |

AUTOMATED RISK VISUALIZATION USING CUSTOMER-CENTRIC DATA ANALYSIS

CROSS REFERENCE TO RELATED APPLICATIONS

This application claims the benefit under 35 U.S.C. § 119(e) of the U.S. Provisional Application Ser. No. 62/532,193, filed Jul. 13, 2017, the content of which is hereby incorporated by reference in its entirety.

FIELD OF THE INVENTION

This disclosure relates to computer-implemented tools for aggregation and visualization of data, and more particularly to computer-implemented tools for aggregation and visualization of customer data of customers whose transactions present a risk of suspicious activity.

BACKGROUND

Conventional tools exist to evaluate the risk customers present due to payment histories, relationships, assets, national affiliations, etc. Many of these tools evaluate risks from individual sources, such as: payment screening sources, risk suspicious activity report (SAR) list(s), monitored transactions, sources that assess risk during customer onboarding, etc.

Such conventional tools lack a holistic basis to evaluate risk(s) presented by customers. Many conventional tools gather data from distinct/unrelated data sources but do not aggregate data and/or visualize data in a meaningful way. Conventional tools may also fail to accommodate customers who perform electronic transfers between countries. Many conventional tools fail to accommodate customers who have multiple accounts, whose transactions transfer across multiple electronic transfer nodes, and/or who enter into multiple intermediate transactions. While it may be desirable to have tools that evaluate the risk(s) presented by customers and/or facilitate visualization of the customer risk profiles, conventional tools have not been able to provide such capabilities.

SUMMARY

Various embodiments can include systems, methods, and non-transitory computer readable media configured to render customer risk visualization tools that provide a customer-centric view of risk for various applications, including anti-money laundering applications. The systems, methods, and non-transitory computer readable media may be configured to: identify a customer risk trigger associated with a customer; detect a response to the customer risk trigger; gather, based on the response, first risk analysis data related to the customer risk trigger from a first datastore; gather, based on the response, second risk analysis data related to the customer risk trigger from a second datastore; gather a customer risk profile to model one or more risk attributes of the customer, the risk attributes representing a risk correlation between the customer and a prohibited act; gather one or more customer risk visualization tools configured to facilitate visual user interaction with the customer risk profile; and render the one or more customer risk visualization tools in a display of the computing system.

In some embodiments, the customer risk trigger is associated with one or more of: a request to perform an electronic transfer by the customer, an indication that the customer is on a known suspicious customer list, and a request by a user to visually interact with the customer risk profile.

In some embodiments, the first data source comprises an internal customer datastore. The first risk analysis data may comprise customer background data associated with the customer. The first risk analysis data may comprise transaction data about a transaction requested by the customer.

In some embodiments, the second data source comprises a public financial crimes datastore.

In some embodiments, the second risk analysis data comprises public financial data associated with the customer.

In some embodiments, the one or more transaction visualization tools are configured to facilitate receiving a request to approve or to deny the electronic transfer.

In some embodiments, the one or more transaction visualization tools are configured to display of an originator of the electronic transfer, a beneficiary of the electronic transfer, or one or more discrepancies between the electronic transfer and past electronic transfers performed by the customer.

In some embodiments, the one or more transaction visualization tools are configured to display a customer risk graph comprising a plurality of customer risk nodes, each of the plurality of customer risk nodes representing a customer account or an individual associated with the customer. The customer risk graph may comprise one or more transaction risk edges coupling a first of the plurality of customer risk nodes to a second of the plurality of customer risk nodes, the one or more transaction risk edges representing a connection between the first of the plurality of customer risk nodes and the second of the plurality of customer risk nodes.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 4 illustrates a screen capture of a customer risk management application, in accordance with various embodiments.

FIG. 6 illustrates a screen capture of a customer risk management application, in accordance with various embodiments.

DETAILED DESCRIPTION

A claimed solution rooted in computer technology overcomes problems specifically arising in the realm of computer technology. In some implementations, a customer risk visualization tool models attributes of a customer transaction risk profile. A "customer risk visualization tool," as used herein, may include a computer-implemented tool configured to facilitate display and/or interaction with a customer risk profile. A "customer risk profile," as used herein, may include a profile associated with the behavior of a customer that represents risk presented by the customer's activity. A customer risk profile may be modeled using risk information data from public and/or private data sources, including but not limited to: payment screening data sources, suspicious activity report (SAR) lists, monitored transactions, onboarding data sources, etc. The customer risk profile may accommodate risk alerts in risk information data by, e.g., weighting, limiting the effect of, adding to the effect of, etc. specific risk alerts. A customer risk profile may model one or more risk attributes of a customer, where risk attributes represent a risk correlation between a customer and a prohibited act (e.g., a likelihood of the customer performing the prohibited act).

The customer transaction risk profile may provide a customer context that model one or more risk attributes (e.g., those representing a risk correlation between the customer and a prohibited act). A "customer context," as used herein, may refer to circumstances that form the setting for a customer risk profile and in terms of which a customer risk profile can be understood, assessed, etc. The customer transaction risk profile may be based on first risk analysis data and/or second risk analysis data. Examples of first risk analysis data and/or second risk analysis data include data gathered from payment screening data sources, suspicious activity report (SAR) lists, monitored transactions, onboarding data sources, and/or financial crimes data sources. In some implementations, first risk analysis data comprises customer background data from an internal customer datastore, and second risk analysis data comprises public financial data from a public financial crimes datastore. The customer risk visualization tool may also facilitate visual user interaction with the customer transaction risk profile by, e.g., allowing a user to visually inspect attributes, relationships, etc. of the customer. The customer risk visualization tool may be used for payment screening, screening of a customer against a known SAR list, transaction monitoring, customer risk assessment during customer onboarding, and/or other applications. The customer risk visualization tool may support enhanced and/or real-time due diligence processes to assess the risk customers' accounts, relationships, activities, etc. present at a point in time.

Figure 1:
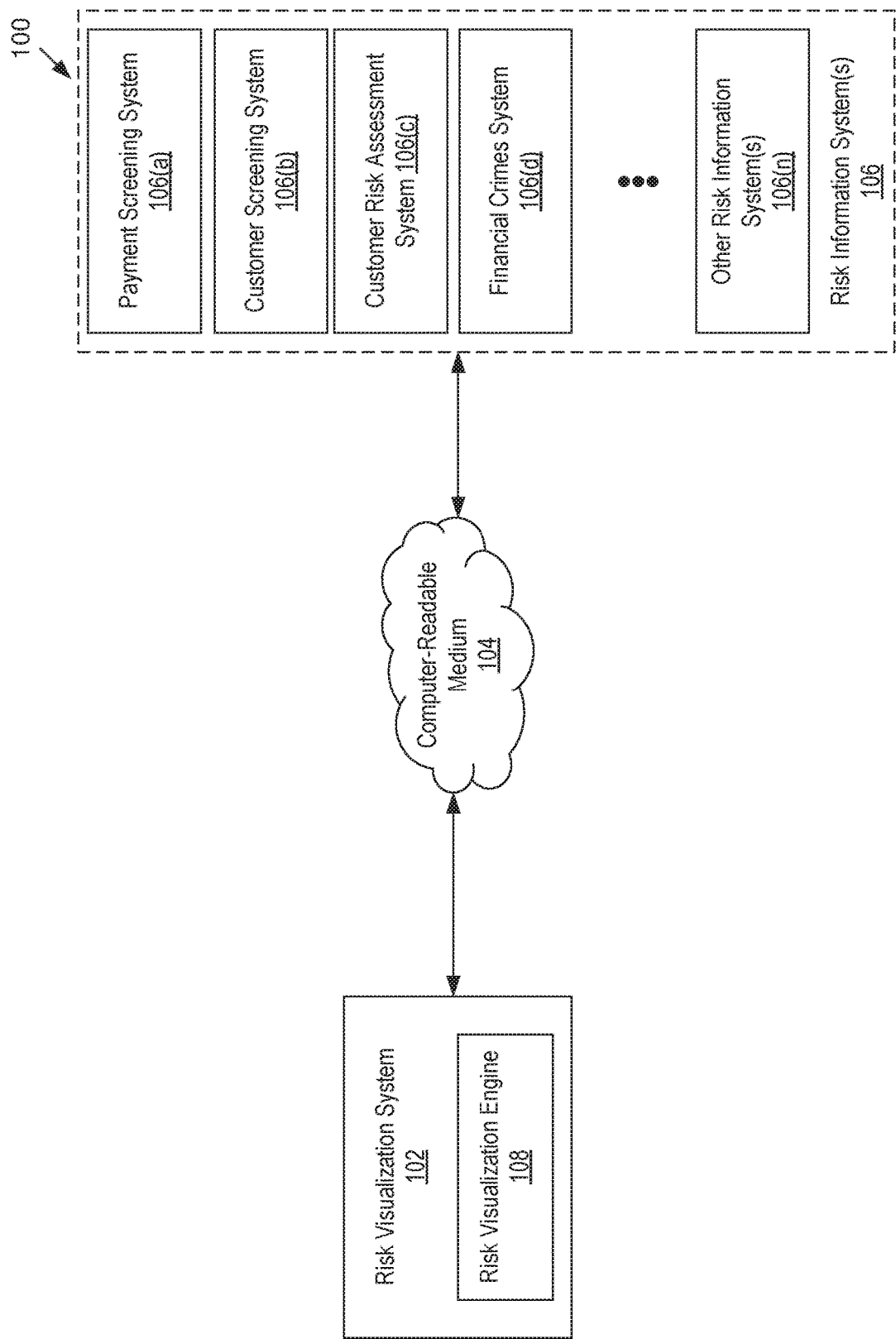
FIG. 1 illustrates an example of a risk visualization environment, in accordance with various embodiments.

FIG. 1 illustrates an example of a risk visualization environment 100, in accordance with various embodiments. The risk visualization environment 100 may include a risk visualization system 102, a computer-readable medium 104, and risk information system(s) 106. The risk visualization system 102 may be coupled to the computer-readable medium 104, which in turn may be coupled to the risk information system(s) 106.

The risk visualization system 102 may include one or more processors and memory. The one or more processors can be configured to perform various operations by interpreting machine-readable instructions stored on the memory. The risk visualization system 102 may include a risk visualization engine 108. The risk visualization engine 108 can be executed by the processor(s) of the risk visualization system 102 to perform various operations, including those described herein. In general, the risk visualization engine 108 can be implemented, in whole or in part, as software that is capable of running on one or more computing devices or systems. In one example, the risk visualization engine 108 may be implemented as or within a software application running on one or more computing devices (e.g., user or client devices) and/or one or more servers (e.g., network servers or cloud servers). In some instances, various aspects of the risk visualization engine 108 may be implemented in one or more computing systems and/or devices. The risk visualization engine 108 may further include one or more datastores (not shown in FIG. 1) that are accessible to the risk visualization system 102. A "datastore," as used herein, may include any device, component, and/or module in which data can be stored and from which data can be retrieved. More details describing the risk visualization engine 108 are provided below in reference to FIG. 2.

The computer-readable medium 104 may include any transitory or non-transitory computer-readable medium. In some implementations, the computer-readable medium 104 includes a wired or wireless network through which data can be sent and received (e.g., the Internet).

The risk information system(s) 106 may include one or more processors and memory. The one or more processors can be configured to perform various operations by interpreting machine-readable instructions stored on the memory. The risk information system(s) 106 may include a payment screening system 106(a), a customer screening system 106(b), a customer risk assessment system 106(c), a financial crimes system 106(d), and other risk information system(s) 106(n). The risk information system(s) 106 may each include one or more computer systems configured to store risk information data related to suspicious activity. "Risk information data," as used herein, may include any data that forms the basis of a risk assessment of a customer. Risk information data may include one or more risk alerts associated therewith; the risk alerts may include portions of the risk information data that the risk information system(s) 106 associate with potentially suspicious activity.

"Suspicious activity," as used herein, may include illegal or illicit activity that can be associated with an electronic transaction. In some implementations, suspicious activity includes money laundering, e.g., the concealment of the origins of illegally obtained money, by various means, including but not limited to means of transfer to foreign financial institutions or legitimate businesses. Money laundering may include acts that do not fall within criminal and/or civil "money laundering" laws of a specific jurisdiction. Money laundering may include processes for transforming profits of crime, corruption, etc. into ostensibly "legitimate" assets. Money laundering may include transfer of consideration that does not include currency, and may relate to misuse of any financial systems (e.g., securities, digital currencies).

In some embodiments, the risk information system(s) 106 are managed by different entities. It is noted that one or more of the risk information system(s) 106 may be managed by a common entity.

The payment screening system 106(a) may include one or more systems configured to store and/or provide payment screening data. Payment screening data may include data institutions use to screen payments to or from customers for suspicious activity. In some embodiments, the payment screening system 106(a) comprises tools to detect and/or perform real-time and/or batch identifications of suspicious payments. The payment screening system 106(a) may implement one or more checkpoints for an institution's payments. In some embodiments, the payment screening system 106(a) is compatible with web-based payment screening and/or filtering systems.

The customer screening system 106(b) may include one or more systems configured to store and/or provide customer screening data. Customer screening data may include data institutions use to screen customers for suspicious activity. In various embodiments, the customer screening data includes data used to screen retail and/or corporate customers of an institution. The payment screening data may include data from fact research tools. The fact research tools may include lists that aggregate content from licensed sources, free sources, etc., and/or provide organizations with search, alerting, dissemination, and/or other information management capabilities. The payment screening data may include date of birth (DOB) information related to entities, countries associated with entities, etc. from fact research tools.

The customer risk assessment system 106(c) may include one or more systems configured to store and/or provide customer risk assessment data. Customer risk assessment data may include background and/or biographical information obtained when customers are on-boarded (open a first account, open or significantly modify an account, etc.) by an institution. The customer risk assessment system 106(c) may gather customer risk assessment data from relevant on-boarding data maintained by institutions.

The financial crimes system 106(d) may include one or more systems configured to store and/or provide financial crimes data. Financial crimes data may include data gathered from financial crime and/or compliance systems. In some embodiments, the financial crimes data includes data gathered from money laundering prevention systems. Financial crimes data may include date of birth (DOB) information related to entities, countries associated with entities, etc. from fact research tools.

The other risk information system(s) 106(n) may include one or more systems configured to store other risk information data. Other risk information data may include any data that indicates risk of suspicious activity and is not payment screening data, customer screening data, customer risk assessment data, or financial crimes data. The other risk information data may include data related to corporate structures of entities, account network analysis data, transaction flow analysis data, data from proactive risk identification processes (e.g., data that is provided when a new board member is added to an organization), etc. In some embodiments, the other risk information data is gathered from institutions that process electronic transactions and/or maintain customer accounts.

The modules in the risk visualization environment 100 may operate to overcome problems specifically arising in the realm of computer technology. In some embodiments, the risk information system(s) 106 may operate to store and/or provide risk information data related to suspicious activity and/or potentially suspicious activity. The risk visualization engine 108 may gather, through the computer-readable medium 104, the risk information data from the risk information system(s) 106. The risk visualization engine 108 may further manage customer risk visualization tools that model attributes of a customer transaction risk profile for a customer of interest. The customer risk profile may be modeled from risk information gathered from the risk information system(s) 106, including but not limited to: payment screening data sources, suspicious activity report (SAR) lists, monitored transactions, onboarding data sources, etc. stored on the risk information system(s) 106. The customer transaction risk profile may be based on first risk analysis data and/or second risk analysis data. Examples of first risk analysis data and/or second risk analysis data include data gathered from payment screening data sources, suspicious activity report (SAR) lists, monitored transactions, onboarding data sources, and/or financial crimes data sources. In some implementations, first risk analysis data comprises customer background data from an internal customer datastore, and second risk analysis data comprises public financial data from a public financial crimes datastore. The customer risk visualization tools may, in managing the customer risk profiles, accommodate risk alerts in risk information data by, e.g., weighting, limiting the effect of, adding to the effect of, etc. specific risk alerts.

In some implementations, the customer risk visualization tools are gathered based on a response to a customer risk trigger. A "customer risk trigger," as used herein, may include a representation of any event, condition, etc. that triggers a visual depiction of a customer risk profile. Customer risk triggers may include, for instance, representation of a request by a customer to perform an electronic transaction, a request by a customer to be on-boarded (e.g., open a new account or a first account with an institution), a request by a user to gather information about a customer through an application on the user's computer, a response to a customer being screened against a SAR list, a response to a payment screening process, etc.

In some embodiments, the customer risk visualization tools managed by the risk visualization engine 108 may facilitate visual user interaction with the customer transaction risk profile by, e.g., allowing a user to visually inspect attributes, relationships, etc. of the customer. In some embodiments, the customer risk visualization tools are configured to allow a user, such as a user of an institution monitoring customers, to approve or deny an electronic transfer. In some embodiments, the customer risk visualization tools are configured to display one or more of an originator of the electronic transfer, a beneficiary of the electronic transfer, or one or more discrepancies between the electronic transfer and past electronic transfers performed by the customer.

In various embodiments, the customer risk visualization tools are configured to display a customer risk graph that includes a plurality of customer risk nodes. A "customer risk graph," as used herein, may include a visual depiction of relationships customers in relation to one another and/or to customers' attributes. A customer risk graph may comprise "customer risk nodes," which may include elements of customer risk graphs that represent a customer or a customer account. (Customer risk nodes may, but need not, be interactive, e.g., configured to allow a user to modify, gather more information regarding, etc.) A customer risk graph may comprise "customer risk edges" or elements that represent relationships between customer risk nodes and/or actions that can be taken between those customer risk nodes. In some implementations, a customer risk graph displayed by the customer risk visualization tools may comprise one or more transaction risk edges coupling a first of the plurality of customer risk nodes to a second of the plurality of customer risk nodes. The one or more transaction risk edges may represent a connection between the first of the plurality of customer risk nodes and the second of the plurality of customer risk nodes.

In some embodiments, the customer risk visualization tools managed by the risk visualization engine 108 support automated due diligence analysis and reporting tools. The automated due diligence analysis and reporting tools may be configured to display the transactions, relationships, and other attributes of a customer at a single point in time. In some implementations, the automated due diligence analysis and reporting tools displays the transactions, relationships, attributes, etc. on a customer risk graph. The automated due diligence analysis and reporting tools may provide reports related to specific customers. The reports may include parts that compliance teams, financial crime investigators, government entities, and/or regulators require or advise risk management entities to scrutinize for risk. In some implementations, the risk visualization engine 108 indexes transactions so users can search through transactions of interest related to a customer. The automated due diligence analysis and reporting tools advantageously may provide an accessible and collaborative environment to identify risk from a customer-centric perspective. More examples of the operation of the risk visualization engine 108 are further discussed in relation to FIG. 2.

Figure 2:
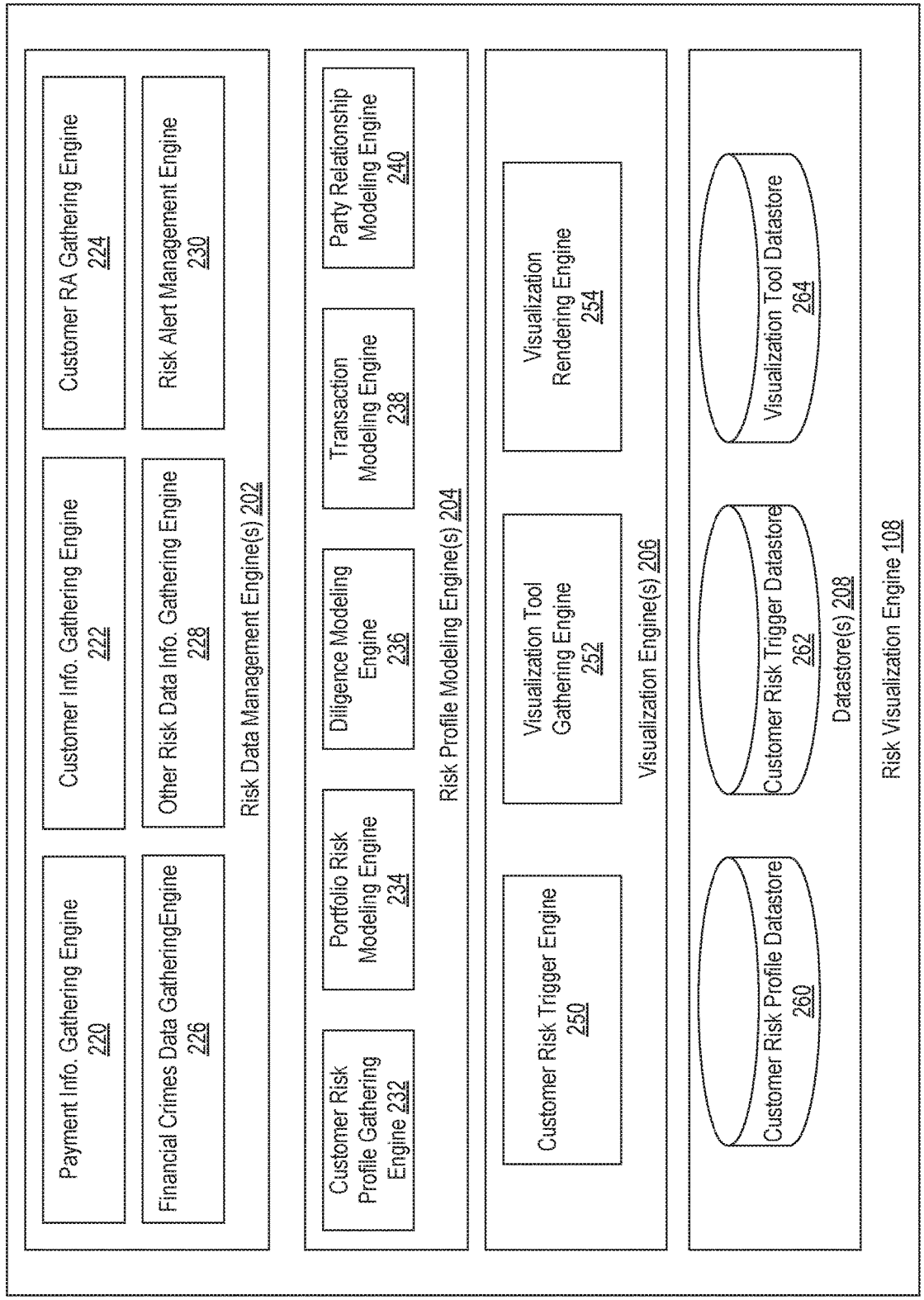
FIG. 2 illustrates an example of a risk visualization engine, in accordance with various embodiments.

FIG. 2 illustrates an example of a risk visualization engine 108, in accordance with various embodiments. The risk visualization engine 108 may include risk data management engine(s) 202, risk profile modeling engine(s) 204, visualization engine(s) 206, and datastore(s) 208. The modules in the risk visualization engine 108 may be coupled to one another or to modules not explicitly shown in FIG. 2.

The risk data management engine(s) 202 may include engines configured to gather risk information data from the risk information system(s) 106. The risk data management engine(s) 202 may also include one or more engines configured to weight, mute, add to, and/or otherwise modify risk alerts associated with the risk information data. The risk data management engine(s) 202 may include a payment information gathering engine 220, a customer information gathering engine 222, a customer risk assessment gathering engine 224, a financial crimes data gathering engine 226, another risk data information gathering engine 228, and a risk alert management engine 230.

The payment information gathering engine 220 may be configured to support a data interface to the payment screening system 106(a). The payment information gathering engine 220 may provide instructions to gather payment screening data, including data related to real-time and/or batch identifications of suspicious payments, and/or data from web-based payment screening/filtering systems.

The customer information gathering engine 222 may be configured to support a data interface to the customer screening system 106(b). The customer information gathering engine 222 may provide instructions to gather customer screening data, such as data used to screen retail and/or corporate customers of an institution, data from fact research tools, etc. The payment screening data may include date of birth (DOB) information related to entities, countries associated with entities, etc. from fact research tools.

The customer risk assessment gathering engine 224 may be configured to support a data interface to the customer risk assessment system 106(c). The customer risk assessment gathering engine 224 may provide instructions to gather customer risk assessment data, such as background and/or biographical information obtained when customers are onboarded by an institution.

The financial crimes data gathering engine 226 may be configured to support a data interface to the financial crimes system 106(d). The financial crimes data gathering engine 226 may provide instructions to gather data from money laundering prevention systems and/or other financial crimes systems. The financial crimes data may include date of birth (DOB) information related to entities, countries associated with entities, etc. from fact research tools.

The other risk data information gathering engine 228 may be configured to support a data interface to the other risk information system(s) 106(n). The other risk data information gathering engine 228 may provide instructions to gather other risk information data related to corporate structures of entities, account network analysis data, transaction flow analysis data, data from proactive risk identification processes (e.g., data that is provided when a new board member is added to an organization), etc. The other risk information data may be gathered from institutions that process electronic transactions and/or maintain customer accounts, as noted further herein.

The risk alert management engine 230 may be configured to manage risk alerts, including those associated with risk information data provided by the risk information system(s) 106. The risk alert management engine 230 may be configured to weight, mute, add to, and/or otherwise modify risk alerts associated with risk information data to make those risk alerts more relevant to a customer context.

In some embodiments, the risk alert management engine 230 modifies and/or filters risk alerts from the payment screening system 106(a). The risk alert management engine 230 may modify conditional risk alerts (e.g., Boolean risk alerts) and/or unconditional risk alerts (e.g., risk alerts based on simple whitelisting of payments) so that these risk alerts are more relevant to a customer context. As an example, the risk alert management engine 230 may modify risk alerts that automatically block large payments (e.g., large mortgage payments) so that those payments can be authorized for a specific customer context. As another example, the risk alert management engine 230 may modify risk alerts that automatically allow, disallow, whitelist, etc. specific payments so that those payments can be authorized for a specific customer context. Modification of risk alerts from the payment screening system 106(a) may reduce risk(s) of false positives.

In various embodiments, the risk alert management engine 230 accommodates risk alerts from the customer screening system 106(b). The risk alert management engine 230 may modify risk alerts based on probabilistic matching algorithms to make these risk alerts more relevant to a customer context. As examples, the risk alert management engine 230 may use additional data to augment date of birth (DOB) matching algorithms and/or country match algorithms to make these algorithms more relevant to a customer context. In some implementations, the risk alert management engine 230 separates (e.g., triages) risk alerts to determine whether an alert is relevant to a customer context.

In some embodiments, the risk alert management engine 230 accommodates risk alerts from the customer risk assessment system 106(*c*). The risk alert management engine 230 may modify risk alerts associated with customer risk assessment data that are not relevant to a customer context. The risk alert management engine 230 may lower risk alert thresholds associated with customer risk assessment data to reduce the number of builds, batches, etc. provided in accordance with customer risk assessment data. In some embodiments, the risk alert management engine 230 assigns weights and/or other values to specific risk alerts underlying customer risk assessment data.

In various embodiments, the risk alert management engine 230 accommodates risk alerts from the financial crimes system 106(*d*). The risk alert management engine 230 may reduce and/or modify risk alerts from a system that are not relevant to a customer context.

In some embodiments, the risk alert management engine 230 accommodates risk alerts from the other risk information system(s) 106(*n*). The risk alert management engine 230 may reduce, augment, and/or modify risk alerts related to corporate structures of entities, account network analysis data, transaction flow analysis data, data from proactive risk identification processes (e.g., data that is provided when a new board member is added to an organization), etc.

The risk profile modeling engine(s) 204 may include engines configured to model one or more customer risk profiles. The customer risk profile may be configured to model one or more risk attributes of a customer. The customer risk profile modeling engine(s) 204 may include a customer risk profile gathering engine 232, a portfolio risk modeling engine 234, a diligence modeling engine 236, a transaction modeling engine 238, and a party relationship modeling engine 240. Any of the customer risk profile gathering engine 232, the portfolio risk modeling engine 234, the diligence modeling engine 236, the transaction modeling engine 238, and the party relationship modeling engine 240 may receive and/or provide models based on data managed by the risk data management engine(s) 202.

The customer risk profile gathering engine 232 may be configured to gather customer risk profiles from the customer risk profile datastore 260. In various implementations, the customer risk profile gathering engine 232 receives risk analysis data, such as risk information data gathered by the risk data management engine(s) 202. The customer risk profile gathering engine 232 may identify customer risk profiles that may include name(s), date(s) of birth, addresses, requests to perform specific transactions, etc. The customer risk profiles may form the basis of portfolio risk models, diligence risk models, transaction risk models, party relationship risk models, etc.

The portfolio risk modeling engine 234 may be configured to provide one or more portfolio risk models relevant to a customer risk profile. A "portfolio risk model," as used herein, may include a model providing a summary of risk due to assets, liabilities, etc. in accounts associated with a customer risk profile. A portfolio risk model may include an aggregate model of the amounts and/or amounts due in various accounts. In some embodiments, a portfolio risk model includes a model of countries associated with customers, biographic information (dates of birth, pseudonyms, background information, etc.) of customers, and/or other information that would summarize risks in customers' accounts. In some implementations, a portfolio risk model includes a model of all companies, assets, etc. in a customer's investment portfolio. A portfolio risk model may include risk alerts relevant to a customer risk profile.

The diligence modeling engine 236 may be configured to provide one or more diligence models relevant to a customer risk profile. A "diligence model," as used herein, may include a model that allows a user to further investigate sources of risk associated with a customer risk profile. A diligence model may allow a user to identify source countries, destination countries, and/or intermediate countries of transactions. A diligence model may allow a user to identify source institutions, destination institutions, and/or intermediate institutions of transactions. In some implementations, a diligence model may flag countries, institutions, etc. that present a high risk of suspicious activity. In various implementations, a diligence model identifies institutional codes (e.g., bank codes) for an electronic transaction to see what countries/institutions/etc. the electronic transaction has passed through. A diligence model may allow a user to identify a customer risk profile of an originator and/or a beneficiary of an electronic transfer.

In some embodiments, the diligence modeling engine 236 supports automated due diligence analysis and reporting tools. To this end, the diligence modeling engine 236 may provide support display of transactions, relationships, and other attributes of a customer at a single point in time. In some implementations, the diligence modeling engine 236 may support displaying transactions, relationships, attributes, etc. on a customer risk graph. The diligence model may provide reports related to specific customers. As noted herein, the reports may include parts that compliance teams, financial crime investigators, government entities, and/or regulators require or advise risk management entities to scrutinize for risk. In some implementations, the diligence modeling engine 236 may index transactions, relationships, attributes, etc. so users can search through transactions of interest related to a customer.

The diligence modeling engine 236 may support one or more risk filters. In some embodiments, the diligence modeling engine 236 supports transaction filters that filter account numbers, account types, account amounts, etc. and/or support keyword searches of accounts. The diligence modeling engine 236 may further support product filters that filter product and/or other attributes of an entity. The diligence modeling engine 236 may also support relationship filters that filter out quantities and/or types of relationships of a customer.

The transaction modeling engine 238 may be configured to provide one or more transaction models relevant to a customer risk profile. A "transaction model," as used herein, may include a model of a specific electronic transaction, such as a specific transfer of funds from one institution to another. A transaction model may provide details of the electronic transaction to a user. In some implementations, a transaction model may include an aggregate model of transactions requested and/or executed in various accounts.

The party relationship modeling engine 240 may be configured to provide one or more party relationship models relevant to a customer risk profile. A "party relationship model," as used herein, may include a model of how a customer associated with a customer risk profile is associated with other individuals, entities, organizations, institutions, countries, etc. A party relationship model may model originator(s), beneficiar(ies), and/or intermediate entities to an electronic transfer. A party relationship model may further include amounts of electronic transfers.

The visualization engine(s) 206 may include engines configured to create customer risk visualization tools using models of customer risk profiles. The visualization engine(s) 206 may include a customer risk trigger engine 250, a visualization tool gathering engine 252, and a visualization rendering engine 254.

The customer risk trigger engine 250 may be configured to gather one or more customer risk triggers from the customer risk trigger datastore 262. The customer risk trigger may include, for instance, representation of a request by a customer to perform an electronic transaction, a request by a customer to be on-boarded (e.g., open a new account or a first account with an institution), a request by a user to gather information about a customer through an application on the user's computer, a response to a customer being screened against a SAR list, a response to a payment screening process, etc. The customer risk profile gathering engine 232 may further detect a response to the one or more customer risk triggers.

The visualization tool gathering engine 252 may be configured to gather one or more customer risk visualization tools from the visualization tool datastore 264. The customer risk visualization tools may support display and/or interaction with a customer risk profile. In some implementations, the customer risk visualization tools support applets, executable components, and/or other components that display and/or support user interaction with a customer risk profile. The customer risk visualization tools may facilitate display and/or user interaction with, e.g., portfolio risk models developed by the portfolio risk modeling engine 234, diligence models supported by the diligence modeling engine 236, transaction models supported by the transaction modeling engine 238, party relationship models supported by the party relationship modeling engine 240, etc.

The visualization rendering engine 254 may be configured to provide instructions to render customer risk visualization tools in a display of a computing system. The visualization rendering engine 254 may provide instructions to graphics hardware (displays, graphics cards, etc.) of a computing system to display customer risk visualization tools.

The customer risk profile datastore 260 may be configured to store customer risk profiles. The customer risk trigger datastore 262 may be configured to store customer risk triggers. The visualization tool datastore 264 may be configured to store customer risk visualization tools.

The customer risk profile gathering engine 232 may operate to identify one or more customer risk triggers associated with a customer. The customer risk trigger may include, for instance, representation of a request by a customer to perform an electronic transaction, a request by a customer to be on-boarded (e.g., open a new account or a first account with an institution), a request by a user to gather information about a customer through an application on the user's computer, a response to a customer being screened against a SAR list, a response to a payment screening process, etc. The customer risk profile gathering engine 232 may further detect a response to the one or more customer risk triggers. The customer risk profile gathering engine 232 may provide the response to other modules, such as the risk data management engine(s) 202.

The risk data management engine(s) 202 may operate to gather first and second risk analysis data related to the customer risk trigger. In some embodiments, the payment information gathering engine 220 may gather payment screening data, e.g., data related to real-time and/or batch identifications of suspicious payments, and/or data from web-based payment screening/filtering systems, from the payment screening system 106(*a*). The customer information gathering engine 222 may operate to gather customer screening data, such as data used to screen retail and/or corporate customers of an institution, data from fact research tools, etc. from the customer screening system 106(*b*).

The customer risk assessment gathering engine 224 may operate to gather customer risk assessment data, such as background and/or biographical information obtained when customers are on-boarded by an institution from the customer risk assessment system 106(*c*). In some implementations, the financial crimes data gathering engine 226 may operate to gather financial crimes data from the financial crimes system 106(*d*). The other risk data information gathering engine 228 may operate to gather other risk information data related to corporate structures of entities, account network analysis data, transaction flow analysis data, data from proactive risk identification processes (e.g., data that is provided when a new board member is added to an organization), etc. from the other risk information system(s) 106(*n*). The specific sequence of gathering the first and second risk analysis data may depend on the specific application, customer risk profile, customer context, etc.

The customer risk profile gathering engine 232 may operate to gather, based on the first risk analysis data and the second risk analysis data, a customer risk profile to model one or more risk attributes of the customer. As noted herein, the risk attributes may represent a risk correlation between the customer and a prohibited act. The customer risk profile gathering engine 232 may further operate to identify customer risk profiles that may include name(s), date(s) of birth, addresses, requests to perform specific transactions, etc. The customer risk profiles may form the basis of portfolio risk models, diligence risk models, transaction risk models, party relationship risk models, etc.

One or more of the risk profile modeling engine(s) 204 may operate to model the customer risk profile for visualization and/or rendering. The diligence modeling engine 236 may operate to provide one or more diligence models relevant to the customer risk profile. The transaction modeling engine 238 may operate to provide one or more transaction models relevant to the customer risk profile. In some embodiments, the party relationship modeling engine 240 may operate to provide one or more party relationship models relevant to a customer risk profile.

The visualization tool gathering engine 252 may operate to gather one or more customer risk visualization tools configured to facilitate visual user interaction with the customer risk profile. The visualization rendering engine 254 may operate to render the one or more customer risk visualization tools in a display of the computing system.

Figure 3:
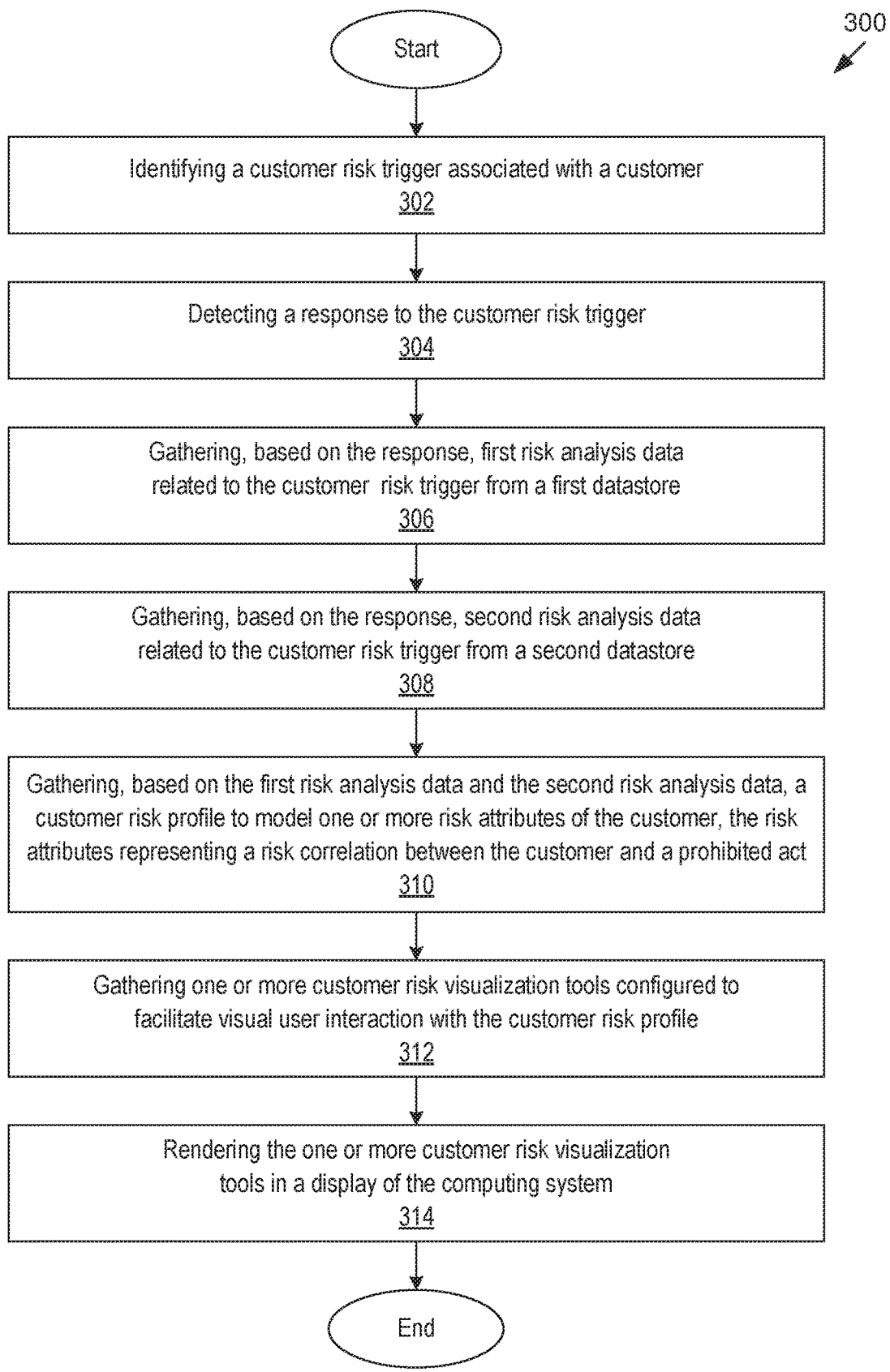
FIG. 3 illustrates a flowchart of an example method for rendering customer risk visualization tools, in accordance with various embodiments.

FIG. 3 illustrates a flowchart of an example method 300 for rendering customer risk visualization tools, in accordance with various embodiments. The method 300 may be implemented in various environments including, for example, the risk visualization environment 100 of FIG. 1 and/or the risk visualization engine 108 of FIG. 2. The operations of method 300 presented below are intended to be illustrative. Depending on the implementation, the example method 300 may include additional, fewer, or alternative steps performed in various orders or in parallel. The example method 300 may be implemented in various computing systems or devices including one or more processors.

At block 302, a customer risk trigger associated with a customer is identified. At a block 304, a response to the customer risk trigger is detected. At a block 306, first risk analysis data related to the customer risk trigger is gathered from a first datastore. At block 308, second risk analysis data related to the customer risk trigger is gathered from a second datastore. At block 310, a customer risk profile is gathered, based on the first risk analysis data and the second risk analysis data, to model one or more risk attributes of the customer. The risk attributes may represent a risk correlation between the customer and a prohibited act. At block 312, one or more customer risk visualization tools are gathered. The one or more risk visualization tools may be configured to facilitate visual user interaction with the customer risk profile. At block 314, the one or more customer risk visualization tools are rendered a display of a computing system.

FIG. 4 illustrates a screen capture 400 of a customer risk management application, in accordance with various embodiments. The information displayed on the screen capture 400 may be taken from risk information systems, aggregated, and then displayed by visualization tools described herein.

The screen capture 400 shows a customer information tab 402, a transactions tab 404, a products tab 406, and a related parties tab 408. The customer information tab 402 is displayed for a specific customer. The customer information tab 402, when selected, may show an account summary area 410 and a customer summary area 412. The account summary area 410 and the customer summary area 412 may be part of a portfolio view for a specific customer.

The account summary area 410 may include a summary of a customer's account. In this example, the account summary area 410 includes a listing of the customer's open accounts, a listing of the customer's closed accounts, a list of related entities, confirmed screening hits, a list of foreign entities, a list of entities having missing country information, and a listing of blocked accounts. The account summary area 410 in this example further includes visual depictions of credit and the debit accounts to the customer. The account summary area 410 may include a risk score as well as a contributing factor for the risk score. The customer summary area 412 may include information relevant to a customer gathered from various risk information sources. In this example, the customer summary area 412 may include a customer identifier, a company number, incorporation data, operation data, sales, assets, employee numbers, and relationship owners.

The information in the account summary area 410 and the customer summary area 412 may be provided as part of automated due diligence analysis and reporting tools. More specifically, in some implementations, the diligence modeling engine 236 may gather lists of accounts, related entities, screening hits, account summaries, risk scores, other customer information, etc. related to a customer to capture the risk status of the customer at a particular moment in time. In some embodiments, the data shown in the account summary area 410 and/or the customer summary area 412 may form the basis of reports generated by the diligence modeling engine 236.

Figure 5:
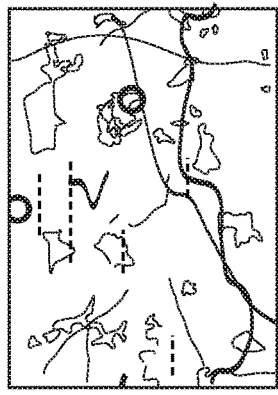
FIG. 5 illustrates a screen capture of a customer risk management application, in accordance with various embodiments.

FIG. 5 illustrates a screen capture 500 of a customer risk management application, in accordance with various embodiments. The screen capture 500 shows the customer information tab 402, the transactions tab 404, the products tab 406, and the related parties tab 408. The customer information tab 402 is displayed for a specific customer. The screen capture 500 shows an address area 502 containing an address of a specific organization, and a map of the address. Data for the map may be gathered from map databases. The screen capture 500 further shows a risk contributor area 504 having risk scores and sources of risk. The risk contributor area 504 may break down parts of a risk score calculated for a customer. In this example, a risk score of 56 has been broken into component parts. In some embodiments, a user may be directed to the screen on the screen capture 500 when the user has selected an address or entity on the account summary area 410 and/or the customer summary area 412. The address area 502 and the risk contributor area 504 may be provided as part of automated due diligence analysis and reporting tools. To this end, the data in the address area 502 and the risk contributor area 504 may be gathered for reporting the risk status of a customer.

FIG. 6 illustrates a screen capture 600 of a customer risk management application, in accordance with various embodiments. The screen capture 600 shows the customer information tab 402, the transactions tab 404, the products tab 406, and the related parties tab 408. Shown herein is a filters area 602, a transaction summary area 604, and a transaction description summary area 606. The filters area 602 may support filtering of transaction data. The transaction summary area 604 may display a bar graph of transactions by date. The transaction description summary area 606 may display a summary of transaction descriptions for a customer, including transaction volume, transaction value, average amount, and date(s)/description(s)/etc. of transactions.

The screen capture 600 may be shown upon selection of the transactions tab 404 for a specific customer. In some embodiments, the filters area 602, the transaction summary area 604, and the transaction description summary area 606 may be part of automated due diligence analysis and reporting tools. To this end, the filters area 602 may allow a user to filter out transaction data that is not relevant to a specific diligence task. For instance, in this example, the filters area 602 may allow a user to filter out account types, account amounts, and/or transactions according with keyword search criteria. The transaction summary area 604 may provide the results of filtered transaction data. In this example, the transaction summary area 604 shows transactions that match with account types, match with account amounts, and/or accord with keyword search criteria. Also shown are transaction volumes, transaction values, and average amounts of transactions. The transaction description summary area 606 may similarly provide a basis for a summary description of a transaction that is used for a diligence task.

Figure 7:
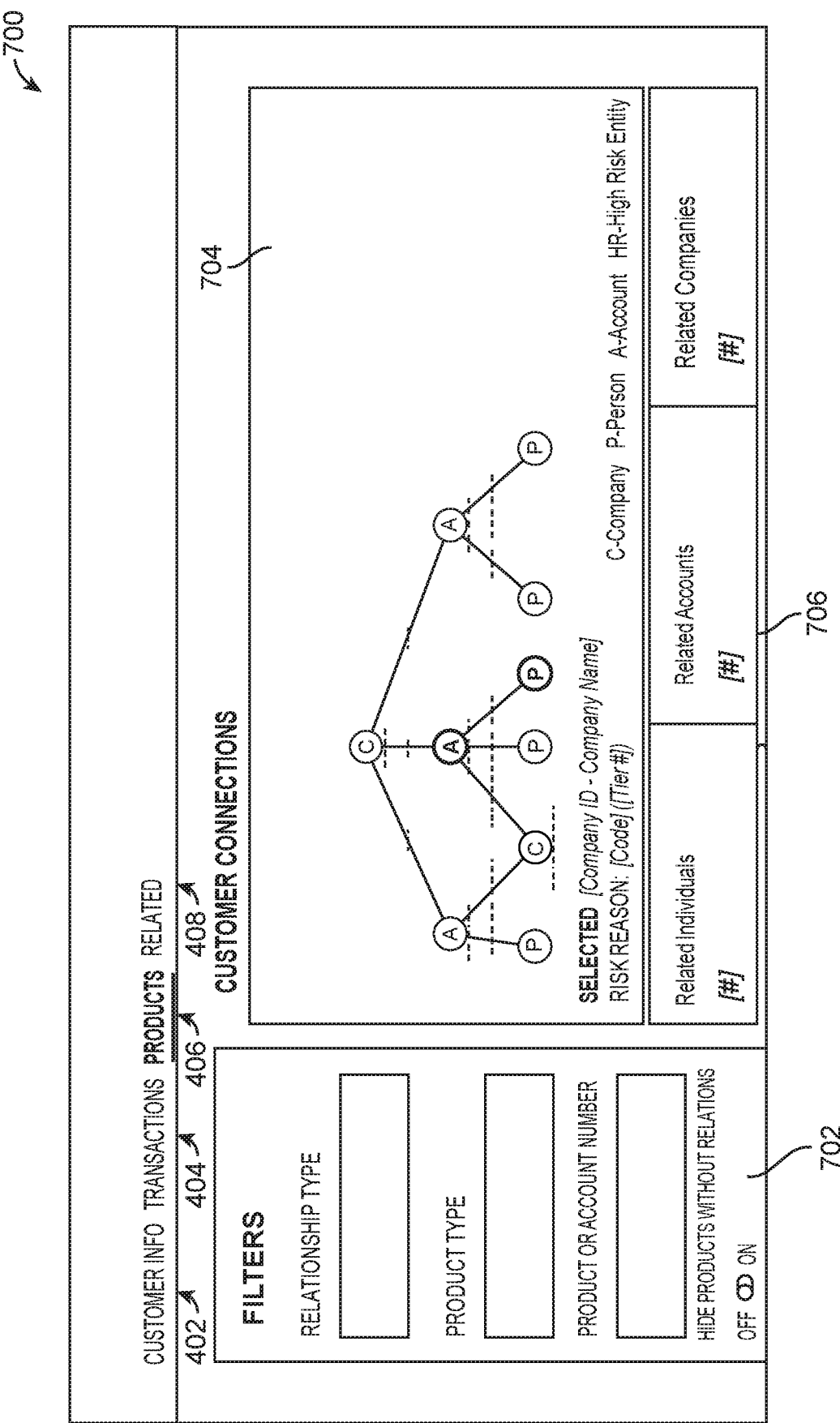
FIG. 7 illustrates a screen capture of a customer risk management application, in accordance with various embodiments.

FIG. 7 illustrates a screen capture 700 of a customer risk management application, in accordance with various embodiments. The screen capture 700 shows the customer information tab 402, the transactions tab 404, the products tab 406, and the related parties tab 408. The products tab 406 has been selected for a specific customer. Shown are a filters area 702, a customer connections area 704, and a customer relationship summary area 706. The customer connections area 704 may show a customer risk graph, in which nodes represent companies, persons, accounts, etc. Edges may represent relationships between nodes and/or actions one node may take on another. Annotations (colors, etc.) may represent risk status(es) of nodes.

The screen capture 700 may be shown upon selection of the products tab 406. In some embodiments, the filters area 702, the customer connections area 704, and the customer relationship summary area 706 may be part of automated due diligence analysis and reporting tools. A user may use the tools in the filters area 702 to filter relevant products to capture products relevant to a customer's risk profile at a specific point in time.

Figure 8:
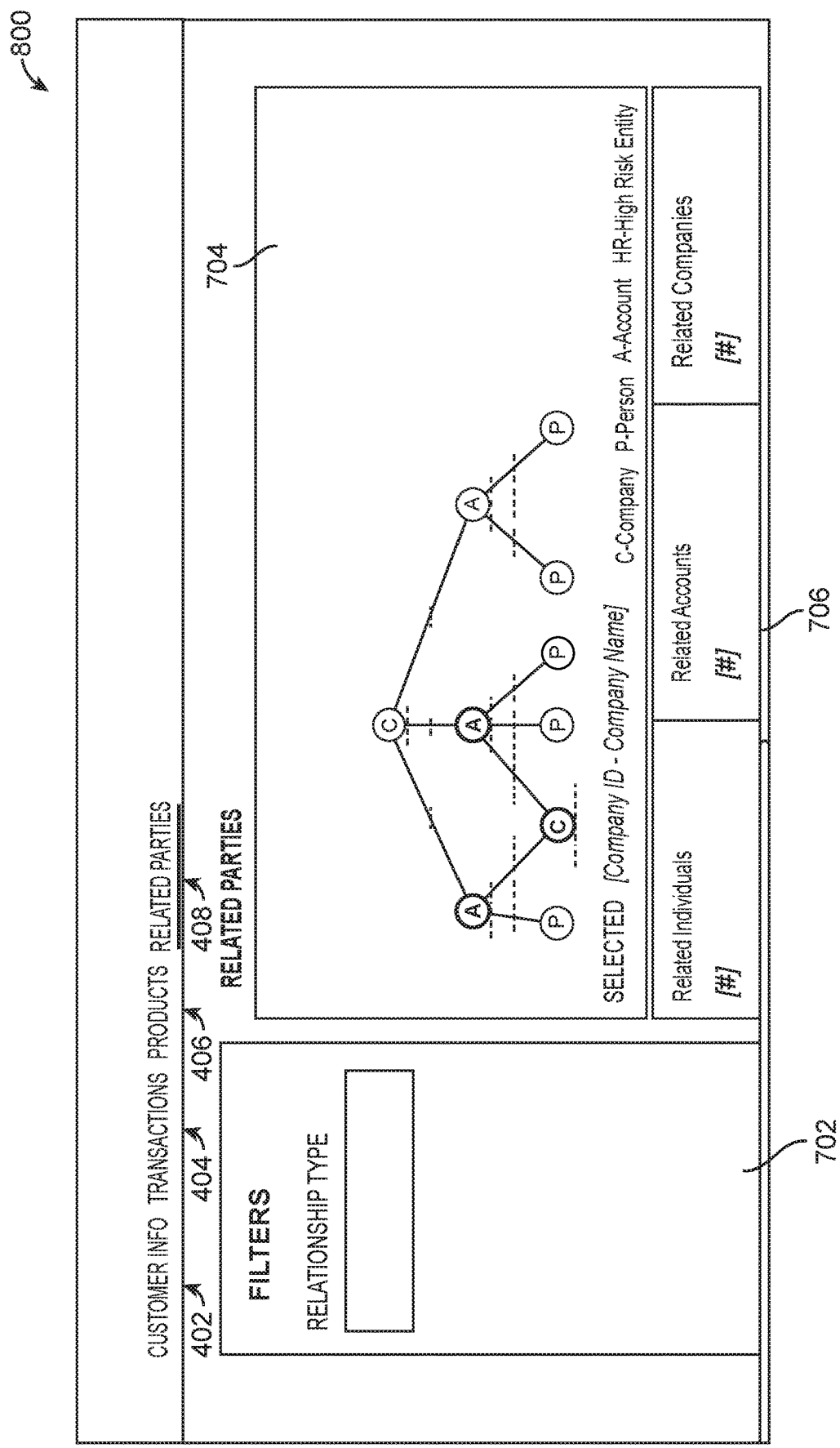
FIG. 8 illustrates a screen capture of a customer risk management application, in accordance with various embodiments.

FIG. 8 illustrates a screen capture 800 of a customer risk management application, in accordance with various embodiments. The screen capture 800 may be shown upon selection of the related parties tab 408. In some embodiments, a filters area 802, a related parties area 804, and the related parties summary area 806 may be part of automated due diligence analysis and reporting tools. A user may use the tools in the filters area 802 to filter relationships to capture connections relevant to a customer's risk profile at a specific point in time.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 9:
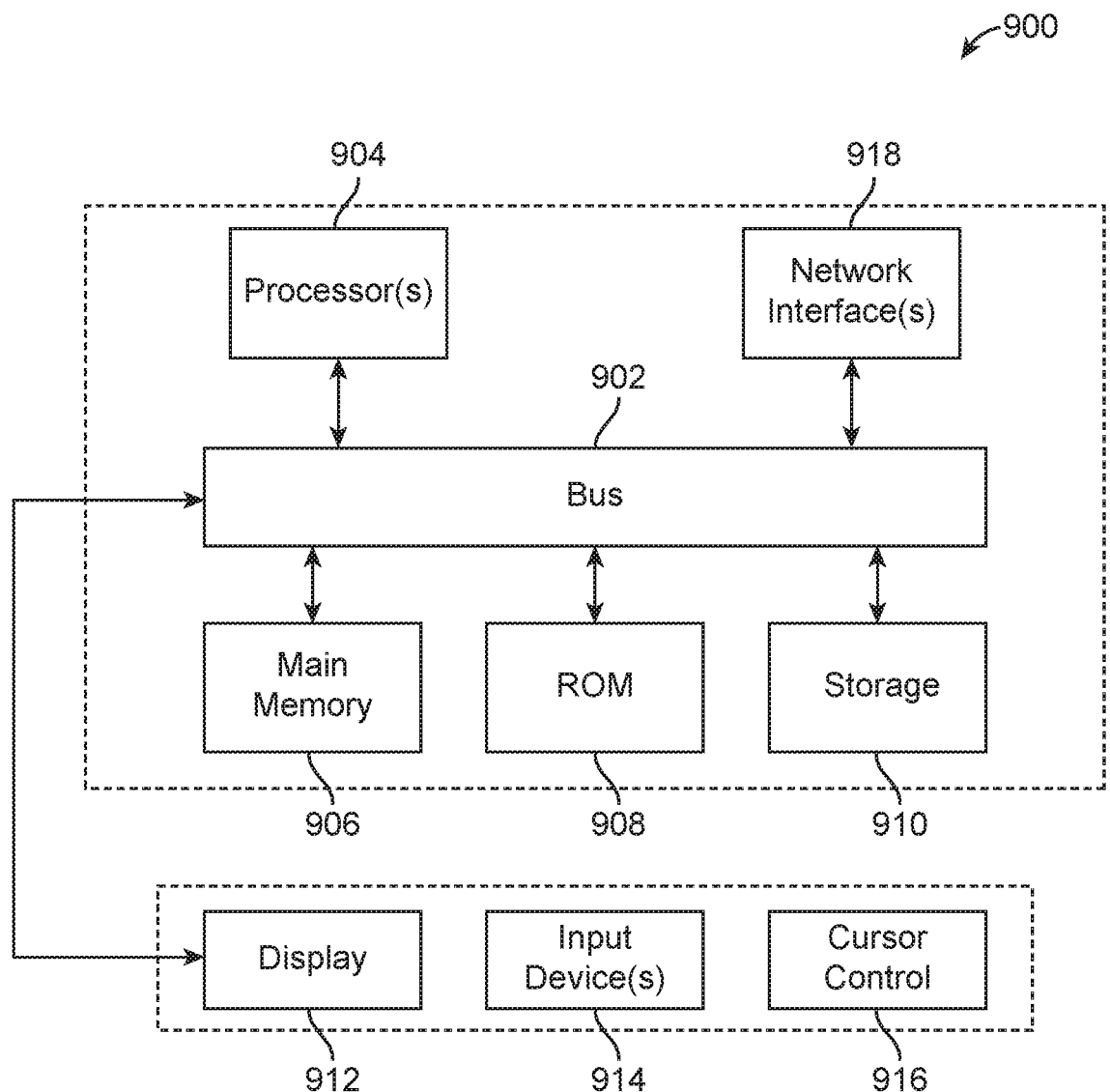
FIG. 9 illustrates a block diagram of an example computer system in which any of the embodiments described herein may be implemented.

FIG. 9 is a block diagram that illustrates a computer system 900 upon which any of the embodiments described herein may be implemented. The computer system 900 includes a bus 902 or other communication mechanism for communicating information, one or more hardware processor(s) 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a cathode ray tube (CRT) or LCD display (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computer system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may retrieves and executes the instructions. The instructions received by main memory 906 may optionally be stored on storage device 910 either before or after execution by processor 904.

The computer system 900 also includes a communication interface 918 coupled to bus 902. Communication interface 918 provides a two-way data communication coupling to one or more network links that are connected to one or more local networks. For example, communication interface 918 may be an integrated service digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method being implemented by a computing system including one or more physical processors and a storage media storing machine-readable instructions, the method comprising:

receiving a trigger associated with an entity, wherein the trigger is associated with one or more of a request to perform an electronic transfer by the entity, an indication that the entity is on a known suspicious list, and a request by a user of the computing system to access information relating to the entity;

gathering, in response to the trigger, first analysis data from a first datastore, the first analysis data comprising data relating to payments and the first datastore is associated with a payment screening system;

gathering, in response to the trigger, second analysis data from a second datastore, the second analysis data comprising results of criminal activity from an investigation of intermediate and final institutions, and data of biographic and location information associated with the entity;

modeling, based on the first analysis data and the second analysis data, a profile associated with the entity, the profile including one or more attributes that provide information of assets and liabilities in accounts associated with the entity, countries of transactions, institutional codes of the transactions, originators and beneficiaries of the transactions, or a corporate structure of a second entity associated with the entity, the one or more attributes representing a correlation between the entity and a prohibited act;

modifying, based on the correlation, criteria associated with the prohibited act for a specific context;

rendering, based on the profile, using one or more visualization tools, a first tab that, upon selected, displays information of the accounts associated with the entity directly above information of the entity, wherein:

the information of the accounts includes a first column identifying an annual credit and annual debit across the accounts and a second column identifying a risk associated with the accounts, the risk being dynamically updated; and the information of the entity includes a third column identifying annual sales associated with the entity and a fourth column identifying a risk associated with a related entity to the entity, the fourth column being positioned directly below the second column and the third column being positioned directly below the first column;

rendering, based on the profile, using the one or more visualization tools, a second tab that, upon selection, populates a first region including a filter selection region and a second region including a pictorial depiction that has a connection graph comprising nodes connected by one or more edges, nodes representing the accounts associated with the entity, companies at which the accounts are held and persons accessing the accounts, and the one or more edges representing relationships between the accounts, the companies, and the persons, wherein the second region is populated based on filters selected in the first region; and rendering, based on the profile, using the one or more visualization tools, a third tab that, upon selection, populates a third region including a second filter selection region and a fourth region including a second pictorial depiction that has a bar graph of transactions associated with the entity, wherein the bar graph provides data relating to transaction volume, transaction value, and average transaction amount over a time period, and wherein the fourth region is populated based on filters selected in the third region.

2. The method of claim 1, wherein the first datastore comprises an internal datastore.

3. The method of claim 2, wherein the first analysis data further comprises background data associated with the entity.

4. The method of claim 2, wherein the first analysis data further comprises transaction data about a transaction requested by the entity.

5. The method of claim 1, wherein the second datastore further comprises a public financial crimes datastore.

6. The method of claim 1, wherein the second analysis data further comprises public financial data associated with the entity.

7. The method of claim 1, wherein the one or more visualization tools are configured to facilitate one or more enhanced due diligence processes to be performed on the first analysis data and the second analysis data associated with the entity.

8. The method of claim 1, wherein the bar graph further includes a filter to filter the transactions based on account types and transaction amounts.

9. A system comprising:
one or more processors; and
a memory storing instructions that, when executed by the one or more processors, cause the system to perform:
receiving a trigger associated with an entity, wherein the trigger is associated with one or more of a request to perform an electronic transfer by the entity, an indication that the entity is on a known suspicious list, and a request by a user of the computing system to access information relating to the entity;

gathering, in response to the trigger, first analysis data from a first datastore, the first analysis data comprising data relating to payments and the first datastore is associated with a payment screening system;

gathering, in response to the trigger, second analysis data from a second datastore, the second analysis data comprising results of criminal activity from an investigation of intermediate and final institutions, and data of biographic and location information associated with the entity;

modeling, based on the first analysis data and the second analysis data, a profile associated with the entity, the profile including one or more attributes that provide information of assets and liabilities in accounts associated with the entity, countries of transactions, institutional codes of transactions, originators and beneficiaries of transactions, or a corporate structure of a second entity associated with the entity, the one or more attributes representing a correlation between the entity and a prohibited act;

modifying, based on the correlation, criteria associated with the prohibited act for a specific context;

rendering, based on the profile, using one or more visualization tools, a first tab that, upon selected, displays information of the accounts associated with the entity directly above information of the entity, wherein:

the information of the accounts includes a first column identifying an annual credit and annual debit across the accounts and a second column identifying a risk associated with the accounts, the risk being dynamically updated; and the information of the entity includes a third column identifying annual sales associated with the entity and a fourth column identifying a risk associated with a related entity to the entity, the fourth column being positioned directly below the second column and the third column being positioned directly below the first column;

rendering, based on the profile, using the one or more visualization tools, a second tab that, upon selection, populates a first region including a filter selection region and a second region including a pictorial depiction that has a connected graph comprising nodes connected by one or more edges, the nodes representing the accounts associated with the entity, companies at which the accounts are held and persons accessing the accounts, and the one or more edges representing relationships between the accounts, the companies, and the persons, wherein the second region is populated based on filters selected in the first region; and rendering, based on the profile, using the one or more visualization tools, a third tab that, upon selection, populates a third region including a second filter selection region and a fourth region including a second pictorial depiction that has a bar graph of transactions associated with the entity, wherein the bar graph provides data relating to transaction volume, transaction value, and average transaction amount over a time period, and wherein the fourth region is populated based on filters selected in the third region.

10. The system of claim 9, wherein the first datastore comprises an internal datastore.

11. The system of claim 10, wherein the first analysis data further comprises background data associated with the entity.

12. The system of claim 10, wherein the first analysis data further comprises transaction data about a transaction requested by the entity.

13. The system of claim 9, wherein the second datastore further comprises a public financial crimes datastore.

14. The system of claim 9, wherein the second analysis data further comprises public financial data associated with the entity.

15. The system of claim 9, wherein the one or more visualization tools are configured to facilitate one or more enhanced due diligence processes to be performed on the first analysis data and the second analysis data associated with the entity.

16. The system of claim 9, wherein the one or more visualization tools are configured to display one or more of an originator of a non-currency transfer, a beneficiary of the non-currency transfer, or one or more discrepancies between the non-currency transfer and past transfers performed by the entity.

17. A non-transitory computer readable storage media of a computing system storing instructions that, when executed by one or more processor of the computing system, cause the computing system to:
receiving a trigger associated with an entity, wherein the trigger is associated with one or more of a request to perform an electronic transfer by the entity, an indication that the entity is on a known suspicious list, and a request by a user of the computing system to access information relating to the entity;
gathering, in response to the trigger, first analysis from a first datastore, the first analysis data comprising data relating to payments and the first datastore is associated with a payment screening system;
gathering, in response to the trigger, second analysis data from a second datastore, the second analysis data comprising results of criminal activity from an investigation of intermediate and final institutions, and data of biographic and location information associated with the entity;
modeling, based on the first analysis data and the second analysis data, a profile associated with the entity, the profile including one or more attributes that provide information of assets and liabilities in accounts associated with the entity, countries of transactions, institutional codes of transactions, originators and beneficiaries of transactions, or a corporate structure of a second entity associated with the entity, the one or more attributes representing a correlation between the entity and a prohibited act;
modifying, based on the correlation, criteria associated with the prohibited act for a specific context;
rendering, based on the profile, using one or more visualization tools, a first tab that, upon selected, displays information of the accounts associated with the entity directly above information of the entity, wherein:
the information of the accounts includes a first column identifying an annual credit and annual debit across the accounts and a second column identifying a risk associated with the accounts, the risk being dynamically updated; and
the information of the entity includes a third column identifying annual sales associated with the entity and a fourth column identifying a risk associated with a related entity to the entity, the fourth column being positioned directly below the second column and the third column being positioned directly below the first column;
rendering, based on the profile, using the one or more visualization tools, a second tab that, upon selection, populates a first region including a filter selection region and a second region including a pictorial depiction that has a connection graph comprising nodes connected by one or more edges, the nodes representing the accounts associated with the entity, companies at which the accounts are held and persons accessing the accounts, and the one or more edges representing relationships between the accounts, the companies, and the persons, wherein the second region is populated based on filters selected in the first region; and
rendering, based on the profile, using the one or more visualization tools, a third tab that, upon selection, populates a third region including a second filter selection region and a fourth region including a second pictorial depiction that has a bar graph of transactions associated with the entity, wherein the bar graph provides data relating to transaction volume, transaction value, and average transaction amount over a time period, and wherein the fourth region is populated based on filters selected in the third region.

18. The non-transitory storage media of claim 17, wherein the second datastore further comprises a public financial crimes datastore.

19. The non-transitory storage media of claim 17, wherein the second analysis data further comprises public financial data associated with the entity.

20. The non-transitory storage media of claim 17, wherein the one or more visualization tools are configured to facilitate one or more enhanced due diligence processes to be performed on the first analysis data and the second analysis data associated with the entity.

* * * * *